(12) United States Patent
Wang et al.

(10) Patent No.: US 12,307,123 B2
(45) Date of Patent: May 20, 2025

(54) MEMORY OPERATION CONTROL METHOD, MEMORY STORAGE DEVICE AND MEMORY CONTROL CIRCUIT UNIT

(71) Applicant: Hefei Core Storage Electronic Limited, Anhui (CN)

(72) Inventors: Chih-Ling Wang, Anhui (CN); Wan-Jun Hong, Anhui (CN); Qi-Ao Zhu, Anhui (CN); Yang Zhang, Anhui (CN); Xin Wang, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 121 days.

(21) Appl. No.: 18/298,345

(22) Filed: Apr. 10, 2023

(65) Prior Publication Data
US 2024/0295982 A1    Sep. 5, 2024

(30) Foreign Application Priority Data
Mar. 1, 2023    (CN) .......................... 202310203235.X

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC .... G06F 3/0604; G06F 3/0655; G06F 3/0659; G06F 3/0679; Y02D 10/00
USPC .......................................................... 711/154
See application file for complete search history.

(56) References Cited

U.S. PATENT DOCUMENTS

| | | | |
|---|---|---|---|
| 2008/0215800 A1 | 9/2008 | Lee et al. | |
| 2016/0041760 A1 | 2/2016 | Kuang et al. | |
| 2020/0034528 A1* | 1/2020 | Yang | G06F 21/6209 |
| 2020/0043556 A1* | 2/2020 | Moon | G06F 3/0652 |
| 2020/0081635 A1* | 3/2020 | Huang | G06F 3/0622 |
| 2021/0064249 A1* | 3/2021 | Mehta | G06F 11/1048 |
| 2022/0283939 A1 | 9/2022 | Duan et al. | |
| 2023/0021668 A1* | 1/2023 | Yeh | G06F 12/0246 |
| 2024/0004554 A1* | 1/2024 | Yeh | G06F 3/0652 |
| 2024/0168651 A1* | 5/2024 | Huang | G06F 3/0659 |

FOREIGN PATENT DOCUMENTS

| | | |
|---|---|---|
| CN | 110569002 | 12/2019 |
| CN | 114077398 | 2/2022 |
| TW | 202129501 | 8/2021 |

* cited by examiner

*Primary Examiner* — Hashem Farrokh
(74) *Attorney, Agent, or Firm* — JCIPRNET

(57) ABSTRACT

A memory operation control method, a memory storage device, and a memory control circuit unit are disclosed. The method includes the following. Management data is established, which includes status recording data. First status information corresponding to a first physical unit is stored in the status recording data. An operation command is received from a host system. The management data is queried according to the operation command. Whether to allow an execution of the operation command on the first physical unit is determined according to a query result.

21 Claims, 6 Drawing Sheets

MEMORY OPERATION CONTROL METHOD, MEMORY STORAGE DEVICE AND MEMORY CONTROL CIRCUIT UNIT

CROSS-REFERENCE TO RELATED APPLICATION

This application claims the priority benefit of China application serial no. 202310203235.X, filed on Mar. 1, 2023. The entirety of the above-mentioned patent application is hereby incorporated by reference herein and made a part of this specification.

BACKGROUND

Technical Field

The disclosure relates to a memory management technology, and in particular to a memory operation control method, a memory storage device, and a memory control circuit unit.

Description of Related Art

The rapid growth of smart phones, tablets, and personal computers in recent years has led to a rapid increase in consumer demands for storage media. Since the rewritable non-volatile memory module (for example, flash memory) has characteristics of non-volatility of data, power saving, small size, and no mechanical structure, it is suitable for built-in in the various portable multimedia devices listed above.

Generally speaking, there are many operation specifications for the rewritable non-volatile memory module. For example, the same memory block may only use one write mode to write data, and memory addresses in the same memory block have to be used in sequence and a previous command is executed before a next command may be executed. If these operation specifications are violated, then data is not correctly written to the rewritable non-volatile memory module. However, in practice, there is no integrated memory operation monitoring mechanism targeted for one or more of the operation specifications, which leads to frequent occurrences of execution failure events of the rewritable non-volatile memory module.

SUMMARY

The disclosure provides a memory operation control method, a memory storage device, and a memory control circuit unit, which can improve the working efficiency of a rewritable non-volatile memory module.

An exemplary embodiment of the disclosure provides a memory operation control method for a rewritable non-volatile memory module. The rewritable non-volatile memory module includes a plurality of physical units. The memory operation control method includes the following. Management data is established, in which the management data includes status recording data. First status information corresponding to a first physical unit in the plurality of physical units is stored in the status recording data. An operation command is received from a host system. The management data is queried according to the operation command. Whether to allow an execution of the operation command on the first physical unit is determined according to a query result.

An exemplary embodiment of the disclosure further provides a memory storage device, which includes a connection interface unit, a rewritable non-volatile memory module, and a memory control circuit unit. The connection interface unit is configured to couple to a host system. The rewritable non-volatile memory module includes a plurality of physical units. The memory control circuit unit is coupled to the connection interface unit and the rewritable non-volatile memory module. The memory control circuit unit is configured to: establish management data, in which the management data includes status recording data; store first status information corresponding to a first physical unit in the plurality of physical units in the status recording data; receive an operation command from the host system; query the management data according to the operation command; and determine whether to allow an execution of the operation command on the first physical unit according to a query result.

An exemplary embodiment of the disclosure further provides a memory control circuit unit configured to control a rewritable non-volatile memory module. The rewritable non-volatile memory module includes a plurality of physical units. The memory control circuit unit includes a host interface, a memory interface, and a memory management circuit. The host interface is configured to couple to a host system. The memory interface is configured to couple to the rewritable non-volatile memory module. The memory management circuit is coupled to the host interface and the memory interface. The memory management circuit is configured to: establish management data, in which the management data includes status recording data; store first status information corresponding to a first physical unit in the plurality of physical units in the status recording data; receive an operation command from the host system; query the management data according to the operation command; and determine whether to allow an execution of the operation command on the first physical unit according to a query result.

Based on the above, after the management data is established, the first status information corresponding to the first physical unit may be stored in the status recording data in the management data. Afterward, according to the operation command from the host system, the management data may be queried, and the query result may be used to determine whether to allow the execution of the operation command on the first physical unit. In this way, the execution failure events of the rewritable non-volatile memory module can be effectively reduced and/or the working efficiency of the rewritable non-volatile memory module can be improved.

DESCRIPTION OF THE EMBODIMENTS

Generally speaking, a memory storage device (also referred to as a memory storage system) includes a rewritable non-volatile memory module and a controller (also referred to as a control circuit). The memory storage device may be used together with a host system so that the host system may write data to the memory storage device or read data from the memory storage device.

Figure 1:
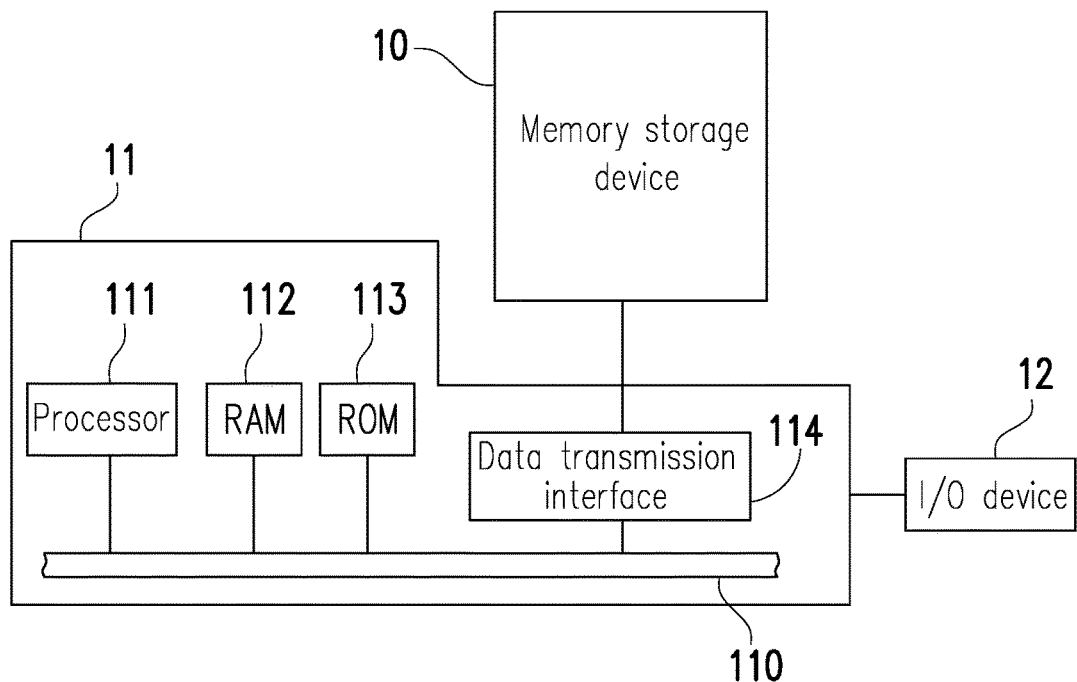
FIG. 1 is a schematic diagram illustrating a host system, a memory storage device, and an input/output (I/O) device according to an exemplary embodiment of the disclosure.
Figure 2:
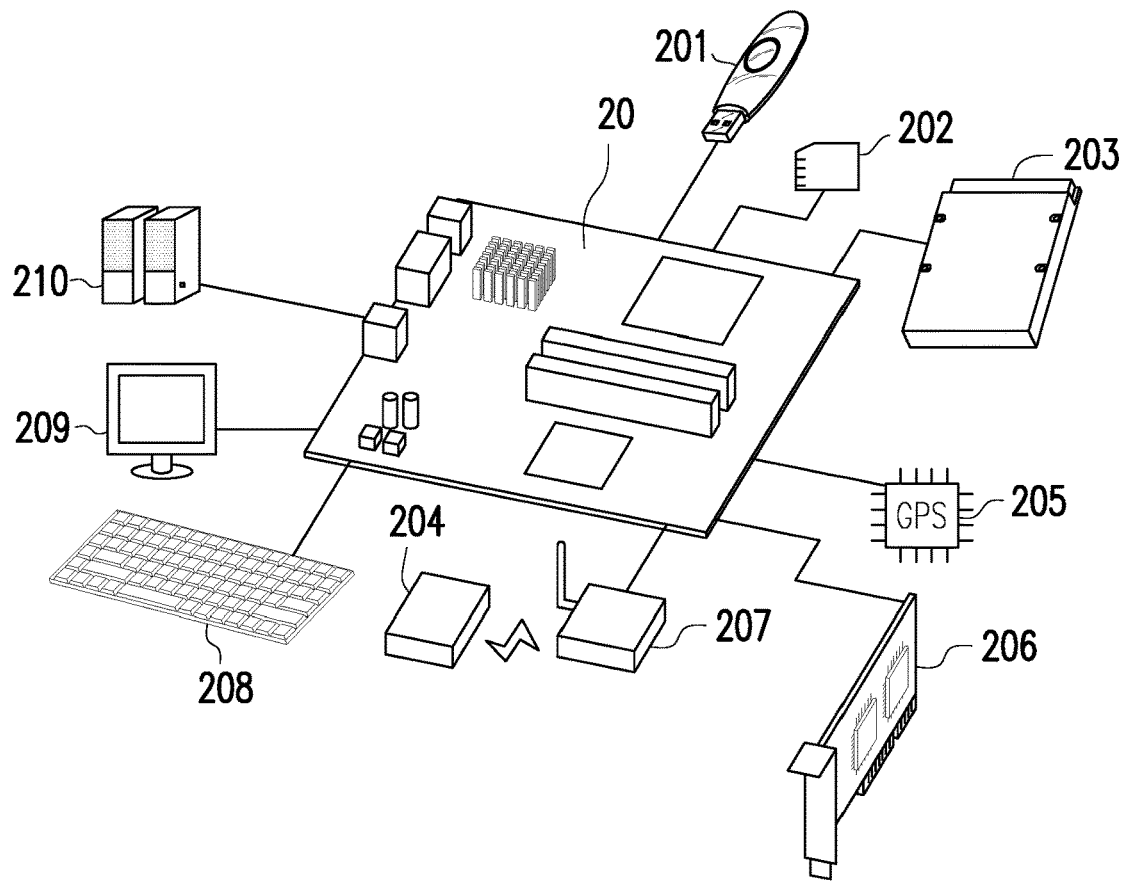
FIG. 2 is a schematic diagram illustrating a host system, a memory storage device, and an I/O device according to an exemplary embodiment of the disclosure.

FIG. 1 is a schematic diagram illustrating a host system, a memory storage device, and an input/output (I/O) device according to an exemplary embodiment of the disclosure. FIG. 2 is a schematic diagram illustrating the host system, the memory storage device, and the I/O device according to an exemplary embodiment of the disclosure.

Referring to FIG. 1 and FIG. 2, a host system 11 may include a processor 111, a random access memory (RAM) 112, a read only memory (ROM) 113, and a data transmission interface 114. The processor 111, the RAM 112, the ROM 113, and the data transmission interface 114 may be coupled to a system bus 110.

In an exemplary embodiment, the host system 11 may be coupled to a memory storage device 10 through the data transmission interface 114. For example, the host system 11 may store data to the memory storage device 10 or read data from the memory storage device 10 via the data transmission interface 114. In addition, the host system 11 may be coupled to an I/O device 12 through the system bus 110. For example, the host system 11 may send an output signal to the I/O device 12 or receive an input signal from the I/O device 12 through the system bus 110.

In an exemplary embodiment, the processor 111, the RAM 112, the ROM 113, and the data transmission interface 114 may be disposed on a motherboard 20 of the host system 11. The number of the data transmission interface 114 may be one or more. Through the data transmission interface 114, the motherboard 20 may be coupled to the memory storage device 10 via a wired or a wireless manner.

In an exemplary embodiment, the memory storage device 10 may be, for example, a flash drive 201, a memory card 202, a solid state drive (SSD) 203, or a wireless memory storage device 204. The wireless memory storage device 204 may be, for example, a near field communication (NFC) memory storage device, a WiFi memory storage device, a Bluetooth memory storage device or a Bluetooth low energy memory storage device (for example, iBeacon) and other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, and various I/O devices through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include a memory storage device 30 and a host system 31 shown in FIG. 3.

Figure 3:
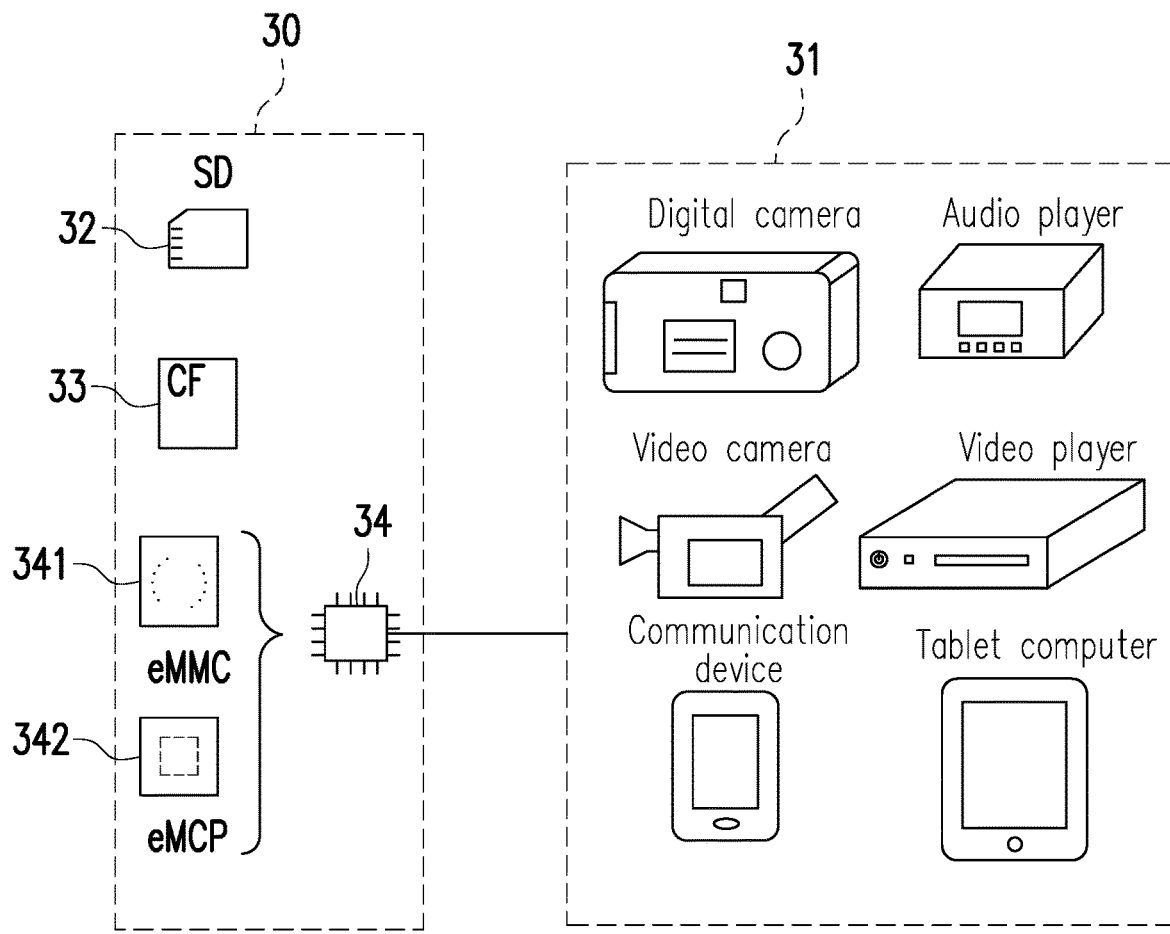
FIG. 3 is a schematic diagram illustrating a host system and a memory storage device according to an exemplary embodiment of the disclosure.

FIG. 3 is a schematic diagram illustrating a host system and a memory storage device according to an exemplary embodiment of the disclosure.

Please refer to FIG. 3. The memory storage device 30 may be used together with the host system 31 to store data. For example, the host system 31 may be a system such as a digital camera, a video camera, a communication device, an audio player, a video player, or a tablet computer. For example, the memory storage device 30 may be various non-volatile memory storage devices such as a secure digital (SD) card 32, a compact flash (CF) card 33, or an embedded storage device 34 used by the host system 31. The embedded storage device 34 includes various types of embedded storage device, in which a memory module is directly coupled to a substrate of the host system, such as an embedded multimedia card (eMMC) 341 and/or an embedded multi chip package (eMCP) storage device 342.

Figure 4:
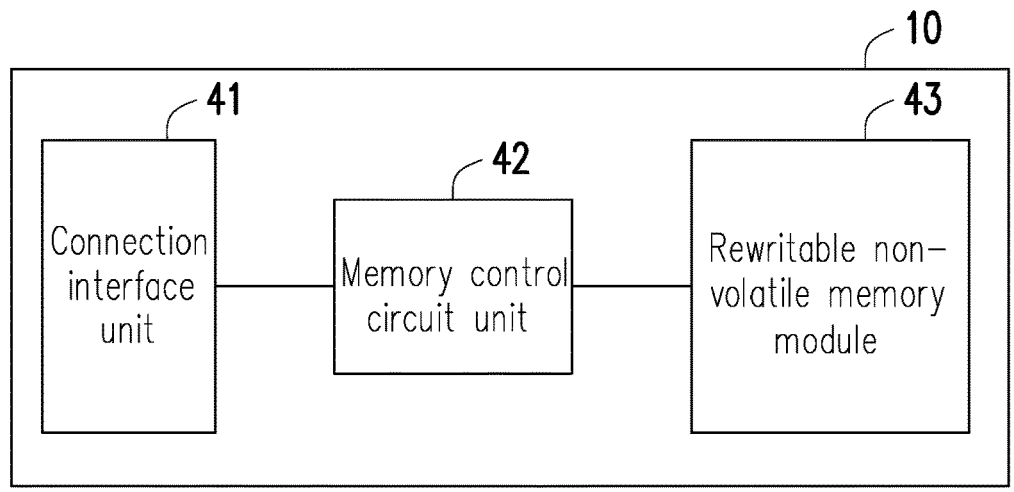
FIG. 4 is a schematic diagram illustrating a memory storage device according to an exemplary embodiment of the disclosure.

FIG. 4 is a schematic diagram illustrating a memory storage device according to an exemplary embodiment of the disclosure.

Referring to FIG. 4, the memory storage device 10 includes a connection interface unit 41, a memory control circuit unit 42, and a rewritable non-volatile memory module 43.

The connection interface unit 41 is configured to couple the memory storage device 10 to the host system 11. The memory storage device 10 may communicate with the host system 11 via the connection interface unit 41. In an exemplary embodiment, the connection interface unit 41 is compatible with the high-speed peripheral component interconnect express (PCI Express) standard. In an exemplary embodiment, the connection interface unit 41 may also conform to the serial advanced technology attachment (SATA) standard, the parallel advanced technology attachment (PATA) standard, the Institute of Electrical and Electronics Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP Interface standard, the CF interface standard, the integrated device electronics (IDE) standard, or other suitable standards. The connection interface unit 41 and the memory control circuit unit 42 may be packaged in a chip, or the connection interface unit 41 may be disposed outside a chip including the memory control circuit unit 42.

The memory control circuit unit 42 is coupled to the connection interface unit 41 and the rewritable non-volatile memory module 43. The memory control circuit unit 42 is configured to execute a plurality of logical gates or control commands implemented in a hardware form or a firmware form and perform operations such as writing, reading, and erasing data in the rewritable non-volatile memory module 43 according to commands of the host system 11.

The rewritable non-volatile memory module 43 is configured to store data written by the host system 11. The rewritable non-volatile memory module 43 may include a single level cell (SLC) NAND flash memory module (that is, a flash memory module which can store 1 bit in a memory cell), a multi level cell (MLC) NAND flash memory module (that is, a flash memory module which can store 2 bits in a memory cell), a triple level cell (TLC) NAND flash memory module (that is, a flash memory module which can store 3 bits in a memory cell), and a quad level cell (QLC) NAND flash memory module (that is, a flash memory module which can store 4 bits in a memory cell), other flash memory modules, or other memory modules with the same characteristics.

Each memory cell in the rewritable non-volatile memory module 43 stores one or more bits by changing a voltage (hereinafter also referred to as a threshold voltage). Specifically, there is a charge trapping layer between a control gate and a channel of each memory cell. By applying a write voltage to the control gate, the amount of electrons in the charge trapping layer may be changed, thereby changing the threshold voltage of the memory cell. This operation of changing the threshold voltage of the memory cell is also referred to as "writing data to the memory cell" or "programming the memory cell". As the threshold voltage changes, each memory cell in the rewritable non-volatile memory module 43 has a plurality of storage statuses. Which storage status a memory cell belongs to may be determined by applying a read voltage, thereby obtaining one or more bits stored in the memory cell.

In an exemplary embodiment, the memory cells of the rewritable non-volatile memory module 43 may form a plurality of physical programming units, and these physical programming units may form a plurality of physical erasing units. Specifically, the memory cells on the same word line may form one or more physical programming units. If a memory cell may store more than 2 bits, then the physical programming units on the same word line may be at least classified into a lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in MLC NAND flash memory, a write speed of the lower physical programming unit is greater than a write speed of the upper physical programming unit, and/or a reliability of the lower physical programming unit is higher than a reliability of the upper physical programming unit.

In an exemplary embodiment, a physical programming unit is a smallest unit of programming. That is, the physical programming unit is a smallest unit for writing data. For example, the physical programming unit may be a physical page or a physical sector. If the physical programming units are physical pages, then these physical programming units may include data bit areas and redundancy bit areas. The data bit area includes a plurality of physical sectors configured to store user data, and the redundancy bit area is configured to store system data (e.g., management data such as an error correcting code). In an exemplary embodiment, the data bit area includes 32 physical sectors, and the size of one physical sector is 512 bytes (B). However, in other exemplary embodiments, the data bit area may also include 8, 16, or more, or less physical sectors, and the size of each physical sector may also be larger or smaller. On the other hand, the physical erasing unit is a smallest unit of erasing. That is, each physical erasing unit contains a minimum number of memory cells that are erased together. For example, the physical erasing unit is a physical block.

Figure 5:
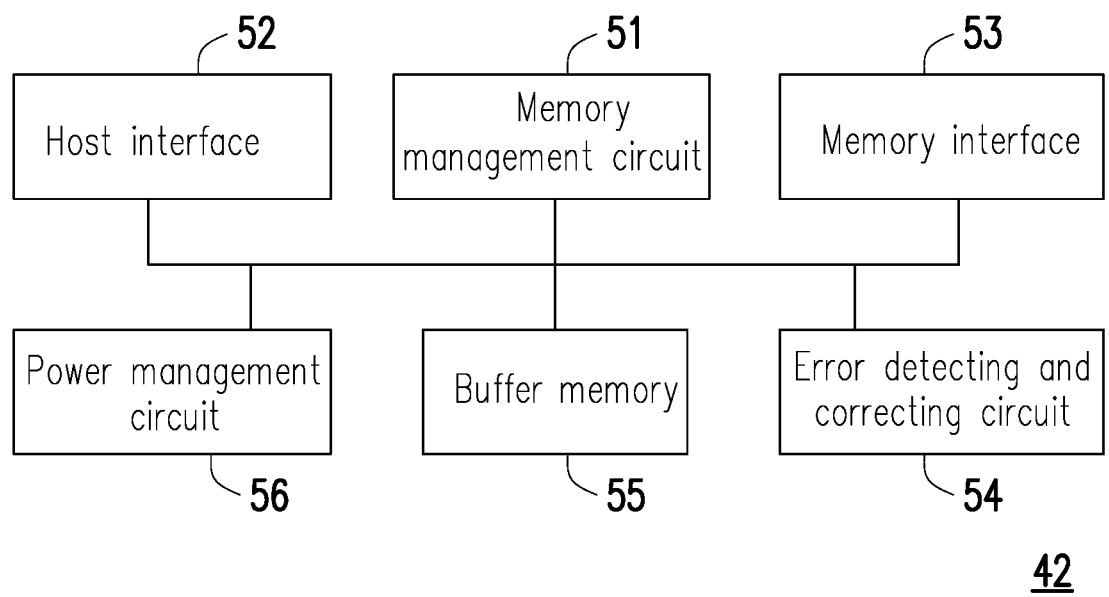
FIG. 5 is a schematic diagram illustrating a memory control circuit unit according to an exemplary embodiment of the disclosure.

FIG. 5 is a schematic diagram illustrating a memory control circuit unit according to an exemplary embodiment of the disclosure.

Referring to FIG. 5, the memory control circuit unit 42 includes a memory management circuit 51, a host interface 52, and a memory interface 53. The memory management circuit 51 is configured to control the overall operation of the memory control circuit unit 42. Specifically, the memory management circuit 51 has a plurality of control commands, and when the memory storage device 10 is in operation, these control commands are executed to perform operations such as writing, reading, and erasing data. When describing the operation of the memory management circuit 51 below, it is equivalent to describing the operation of the memory control circuit unit 42.

In an exemplary embodiment, the control commands of the memory management circuit 51 are implemented in the firmware form. For example, the memory management circuit 51 has a microprocessor unit (not illustrated) and a ROM (not illustrated), and these control commands are burned into the ROM. When the memory storage device 10 is in operation, these control commands are executed by the microprocessor unit to perform operations such as writing, reading, and erasing data.

In an exemplary embodiment, the control commands of the memory management circuit 51 may also be stored in a specific area (for example, a system area dedicated to storing the system data in a memory module) of the rewritable non-volatile memory module 43 in a programming code form. In addition, the memory management circuit 51 has a microprocessor unit (not illustrated), a ROM (not illustrated), and a RAM (not illustrated). In particular, the ROM has a boot code, and when the memory control circuit unit 42 is enabled, the microprocessor unit first executes the boot code to load the control commands stored in the rewritable non-volatile memory module 43 into the RAM of the memory management circuit 51. Afterward, the microprocessor unit runs these control commands to perform operations such as writing, reading, and erasing data.

In an exemplary embodiment, the control commands of the memory management circuit 51 may also be implemented in the hardware form. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage memory cells or memory cell groups of the rewritable non-volatile memory module 43. The memory write circuit is configured to issue a write command sequence to the rewritable non-volatile memory module 43 to write data to the rewritable non-volatile memory module 43. The memory read circuit is configured to issue a read command sequence to the rewritable non-volatile memory module 43 to read data from the rewritable non-volatile memory module 43. The memory erase circuit is configured to issue an erase command sequence to the rewritable non-volatile memory module 43 to erase data from the rewritable non-volatile memory module 43. The data processing circuit is configured to process data to be written to the rewritable non-volatile memory module 43 and data read from the rewritable non-volatile memory module 43. The write command sequence, the read command sequence, and the erase command sequence may each include one or more program codes or command codes and are configured to command the rewritable non-volatile memory module 43 to execute corresponding operations such as writing, reading, and erasing. In an exemplary embodiment, the memory management circuit 51 may also issue other types of command sequence to the rewritable non-volatile memory module 43 to command an execution of a corresponding operation.

The host interface 52 is coupled to the memory management circuit 51. The memory management circuit 51 may communicate with the host system 11 through the host interface 52. The host interface 52 may be configured to receive and identify commands and data sent by the host system 11. For example, the commands and data sent by the host system 11 may be sent to the memory management circuit 51 through the host interface 52. In addition, the memory management circuit 51 may send data to the host system 11 through the host interface 52. In this exemplary embodiment, the host interface 52 is compatible with the PCI Express standard. However, it should be understood that the disclosure is not limited thereto, and the host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and configured to access the rewritable non-volatile memory module 43. For example, the memory management circuit 51 may access the rewritable non-volatile memory module 43 through the memory interface 53. That is to say, data to be written to the rewritable non-volatile memory module 43 is converted to a format acceptable to the rewritable non-volatile memory module 43 through the memory interface 53. Specifically, if the memory management circuit 51 is to access the rewritable non-volatile memory module 43, the memory interface 53 sends a corresponding command sequence. For example, these command sequences may include a write command sequence to command writing data, a read command sequence to command reading data, an erase command sequence to command erasing data, and corresponding command sequences configured to command various memory operations (for example, changing a read voltage level or executing a garbage collection operation). These command sequences are, for example, generated by the memory management circuit 51 and sent to the rewritable non-volatile memory module 43 through the memory interface 53. These command sequences may include one or more signals, or data on a bus. The signals or data may include command codes or program codes. For example, in the read command sequence, read information such as an identification code and a memory address are included.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and configured to execute error detecting and correcting operations to ensure correctness of data. Specifically, when the memory management circuit 51 receives a write command from the host system 11, the error detecting and correcting circuit 54 generates a corresponding error correcting code (ECC) and/or an error detecting code (EDC) for data corresponding to the write command, and the memory management circuit 51 writes the data corresponding to the write command and the corresponding ECC and/or the EDC to the rewritable non-volatile memory module 43. Afterward, when the memory management circuit 51 reads data from the rewritable non-volatile memory module 43, the ECC and/or the EDC corresponding to the data is simultaneously read, and the error detecting and correcting circuit 54 executes the error detecting and correcting operations on the read data according to the ECC and/or the EDC.

The buffer memory 55 is coupled to the memory management circuit 51 and configured to temporarily store data. The power management circuit 56 is coupled to the memory management circuit 51 and configured to control the power of the memory storage device 10.

In an exemplary embodiment, the rewritable non-volatile memory module 43 in FIG. 4 may include a flash memory module. In an exemplary embodiment, the memory control circuit unit 42 in FIG. 4 may include a flash memory controller. In an exemplary embodiment, the memory management circuit 51 in FIG. 5 may include a flash memory management circuit.

Figure 6:
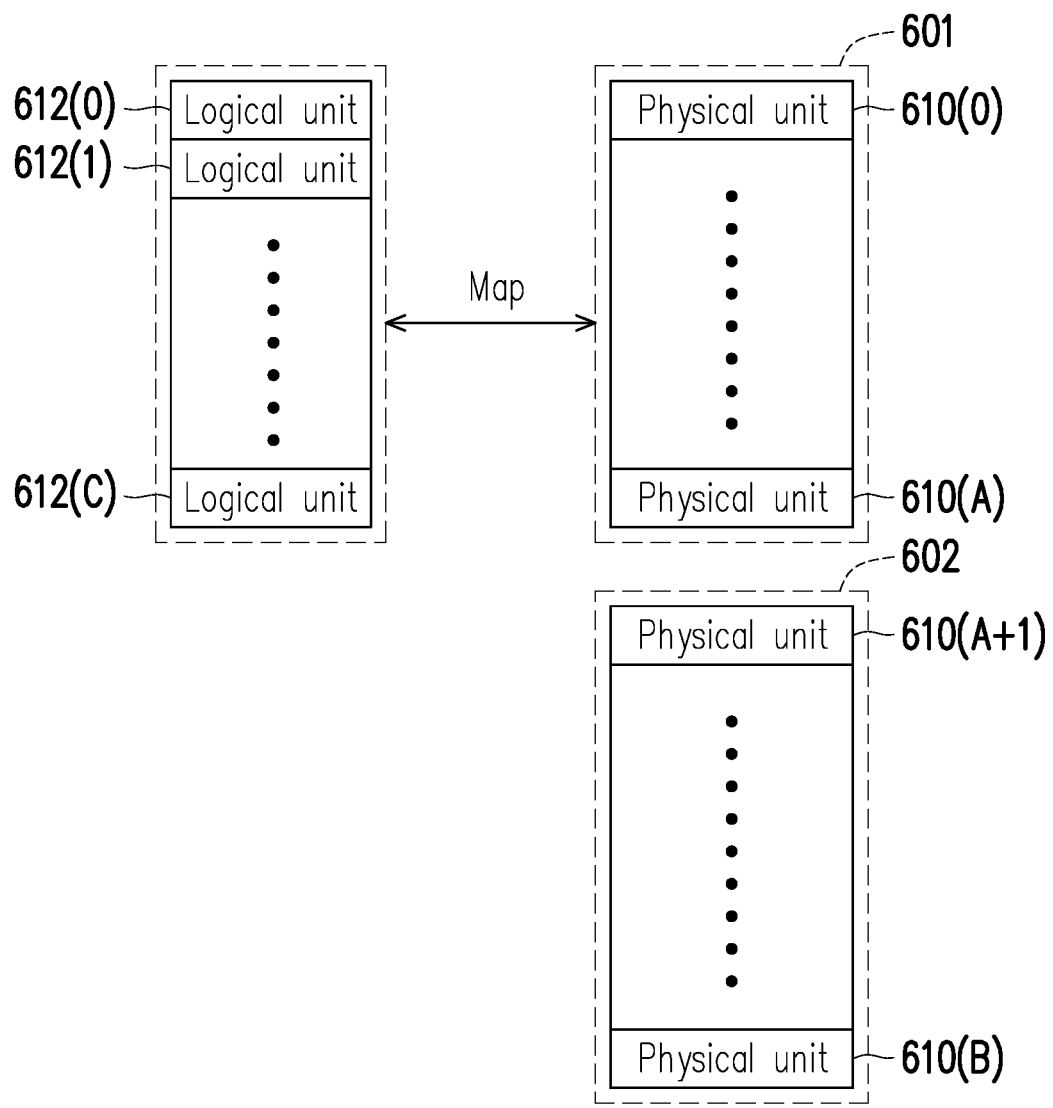
FIG. 6 is a schematic diagram illustrating managing a rewritable non-volatile memory module according to an exemplary embodiment of the disclosure.

FIG. 6 is a schematic diagram illustrating managing a rewritable non-volatile memory module according to an exemplary embodiment of the disclosure.

Referring to FIG. 6, the memory management circuit 51 may logically group physical units 610(0) to 610(B) in the rewritable non-volatile memory module 43 into a storage area 601 and a spare area 602. In an exemplary embodiment, a physical unit refers to a physical erasing unit. However, in another exemplary embodiment, a physical unit may also include a plurality of physical erasing units.

The physical units 610(0) to 610(A) in the storage area 601 are configured to store user data (such as user data from the host system 11 in FIG. 1). For example, the physical units 610(0) to 610(A) in the storage area 601 may store valid data and/or invalid data. The physical units 610(A+1) to 610(B) in the spare area 602 do not store data (e.g., the valid data). For example, if a certain physical unit does not store the valid data, then this physical unit may be associated (or added) to the spare area 602. In addition, the physical unit (or the physical unit that does not store the valid data) in the spare area 602 may be erased. When writing new data, one or more physical units may be selected from the spare area 602 to store the new data. In an exemplary embodiment, the spare area 602 is also referred to as a free pool.

The memory management circuit 51 may configure logical units 612(0) to 612(C) to map the physical units 610(0) to 610(A) in the storage area 601. In an exemplary embodiment, each logical unit corresponds to a logical address. For example, a logical address may include one or more logical block addresses (LBA) or other logical management units. In an exemplary embodiment, a logical unit may also correspond to a logical programming unit or comprise a plurality of continuous or discontinuous logical addresses. A, B and C are all positive integers and may be adjusted according to practical needs, and the disclosure is not limited thereto.

It should be noted that a logical unit may be mapped to one or more physical units. If a physical unit is currently mapped by a logical unit, then it indicates that data currently stored in the physical unit includes valid data. Conversely, if a physical unit is not currently mapped by any logical unit, then it indicates that the data currently stored in the physical unit is invalid data.

The memory management circuit 51 may record management data (also referred to as logical-to-physical mapping information) describing a mapping relationship between logical units and physical units in at least one logical-to-physical mapping table. When the host system 11 intends to read data from the memory storage device 10 or write data to the memory storage device 10, the memory management circuit 51 may access the rewritable non-volatile memory module 43 according to data in the logical-to-physical mapping table.

Figure 7:
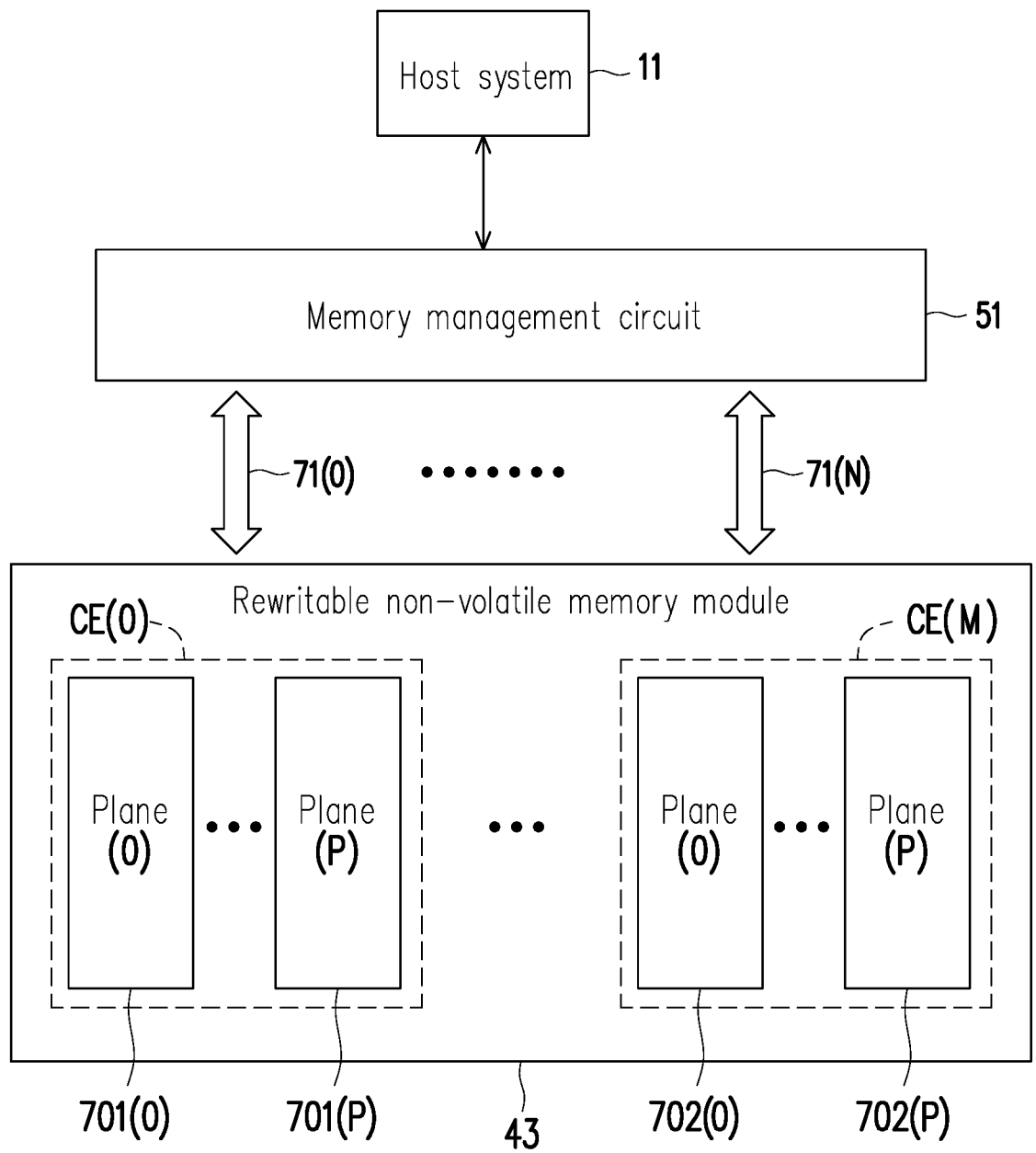
FIG. 7 is a schematic diagram illustrating a system architecture of a memory storage device according to an exemplary embodiment of the disclosure.

FIG. 7 is a schematic diagram illustrating a system architecture of a memory storage device according to an exemplary embodiment of the disclosure.

Please refer to FIG. 7. The rewritable non-volatile memory module 43 may include a plurality of chip enabled (CE) areas CE(0) to CE(M). For example, the rewritable non-volatile memory module 43 may include one or more dies. The die is obtained from a wafer through laser cutting. Each die may be divided into one or more chip enabled areas. Each chip enabled area of the chip enabled areas CE(0) to CE(M) may include one or more planes (also referred to as memory planes). Each plane may contain a plurality of physical units.

It should be noted that whether a certain chip enabled area may be accessed may be controlled through a chip enabled signal corresponding to the chip enabled area. For example, when a chip enabled signal corresponding to the chip enabled area CE(i) is pulled up, the rewritable non-volatile memory module 43 may read data from the chip enabled area CE(i) or store the data into the chip enabled area CE(i). However, if the chip enabled signal corresponding to the chip enabled area CE(i) is not pulled up, the rewritable non-volatile memory module 43 cannot read data from the chip enabled area CE(i) or store the data to the chip enabled area CE(i).

It should be noted that in this exemplary embodiment, each chip enabled area in the chip enabled areas CE(0) to CE(M) contains the same number of planes (marked as plane (0) to plane (P)) as an example. For example, the chip enabled area CE(0) includes planes 701(0) to 701(P), and the chip enabled area CE(M) includes planes 702(0) to 702(P), and so on. However, the total number (i.e., P) of planes in different chip enabled areas may also be different, and the disclosure is not limited thereto.

The memory management circuit 51 may access the rewritable non-volatile memory module 43 via channels (also referred to as memory channels) 71(0) to 71(N). In particular, each channel of the channels 71(0) to 71(N) may be used to access one or more specific chip enabled areas. For example, the channel 71(0) may be configured to access the chip enabled area CE(0) (and the plane 701(0) to 701(P)), and the channel 71(N) may be configured to access the chip enabled area CE(M) (and the plane 702(0) to 702(P)) etc., and so on, and N may be the same or different from M. In addition, N, M, and P are all positive integers and may be adjusted according to practical needs, and the disclosure is not limited thereto.

In an exemplary embodiment, the memory management circuit 51 may establish the management data. The memory management circuit 51 may store the management data in a specific area (such as a system area) in the rewritable non-volatile memory module 43. In an exemplary embodiment, the memory management circuit 51 may set an access right of the physical units in the system area to be inaccessible to a user and/or the host system 11. In this way, the user and/or the host system 11 may avoid accidental modification or deletion of data in the system area, causing the memory storage device 10 to fail to operate normally. In an exemplary embodiment, the management data may also be stored in any physical unit and/or other storage areas in the rewritable non-volatile memory module 43, and the disclosure is not limited thereto.

In an exemplary embodiment, the management data includes status recording data. The memory management circuit 51 may store status information (also referred to as first status information) corresponding to a specific physical unit (also referred to as a first physical unit) in the status recording data. For example, the first physical unit may include any physical unit of the physical units 610(0) to 610(B) in FIG. 6. Afterward, the memory management circuit 51 may obtain the status information related to the first physical unit (i.e., the first status information) according to the status recording data. In addition, when a usage status of the first physical unit changes, the memory management circuit 51 may update the first status information in response to the change. The updated first status information may be stored in the status recording data.

In an example embodiment, the first status information may reflect an operation mode of the first physical unit (also referred to as a first operation mode). For example, the first operation mode may refer to a current operation mode of the first physical unit or a preset operation mode of the first physical unit. For example, the first operation mode may include an SLC mode, an MLC mode, a TLC mode, or a QLC mode, etc., and the type of the first operation mode is not limited thereto. Thereby, the memory management circuit 51 may obtain the operation mode of the first physical unit according to the first status information.

In an exemplary embodiment, the first status information may include identification information (also referred to as first identification information). The first identification information may be configured to identify the operation mode of the first physical unit (i.e., the first operation mode). For example, if a bit value of a specific bit (also referred to as a first identification bit) in the first identification information is "0", then it indicates that the first operation mode is a certain operation mode (such as the SLC mode). If the bit value of the first identification bit in the first identification information is "1", then it indicates that the first operation mode is another operation mode (such as the MLC mode, the TLC mode, or the QLC mode). In addition, the first identification information may also indicate the type of the first operation mode in other ways, and the disclosure is not limited thereto.

In an exemplary embodiment, the first status information may also reflect a data storage status of the first physical unit. For example, the first status information may reflect whether the first physical unit is full (i.e. whether all the physical programming units in the first physical unit have been written). In an exemplary embodiment, a full physical unit may be regarded as a physical unit in a stable status, and/or a non-full physical unit may be regarded as a physical unit in an unstable status. In this way, the memory management circuit 51 may obtain the data storage status of the first physical unit according to the first status information.

In an exemplary embodiment, the first status information may include another piece of identification information (also referred to as second identification information). The second identification information may be configured to identify the data storage status of the first physical unit. For example, if a bit value of a specific bit in the second identification information (also referred to as a second identification bit) is "1", then it indicates that the first physical unit is full. If the bit value of the second identification bit is "0", then it indicates that the first physical unit is empty (that is, no data has been written yet) or the first physical unit has stored data but is not full yet. In addition, the second identification information may also indicate the data storage status of the first physical unit in other ways, and the disclosure is not limited thereto.

In an exemplary embodiment, the first status information may further include address information of a last programmed physical programming unit (also referred to as a first physical programming unit) in the first physical unit. For example, if there are a plurality of physical programming units already programmed in the first physical unit to store data, the first physical programming unit refers to the last programmed physical programming unit among these already programmed physical programming units. In this way, the memory management circuit 51 may obtain the address information of the last programmed physical programming unit in the first physical unit (i.e., the first physical programming unit) according to the first status information.

In an exemplary embodiment, the memory management circuit 51 may receive at least one operation command from the host system. For example, the operation command may include a write command, a read command, and an erase command. The write command commands to store data. The read command commands to read data. The erase command commands to erase data. In addition, the operation commands may also include other types of operation command, and the disclosure is not limited thereto.

In an exemplary embodiment, the memory management circuit 51 may query the management data according to the operation command. Then, the memory management circuit 51 may determine whether to allow an execution of the operation command on the first physical unit according to a query result. For example, the query result may include a query result for the first status information. For example, according to the query result, the memory management circuit 51 may obtain the first status information. Then, the memory management circuit 51 may determine whether to allow the execution of the operation command on the first physical unit according to the first status information.

In an exemplary embodiment, before issuing an operation command sequence to command the rewritable non-volatile memory module 43 to execute an operation action corresponding to the operation command, the memory management circuit 51 may obtain the characteristic information of the operation action. The memory management circuit 51 may compare the characteristic information with the query result (or the first status information). If (or in response to) the comparison result reflects that the characteristic information matches the query result (or the first status information), then the memory management circuit 51 may allow the execution of the operation command on the first physical unit. In addition, if (or in response to) the comparison result reflects that the characteristic information and the query result (or the first status information) do not match each other, then the memory management circuit 51 may prohibit the execution of the operation command on the first physical unit.

In an exemplary embodiment, if the memory management circuit 51 allows the execution of the operation command on the first physical unit, then the memory management circuit 51 may send an operation command sequence to command the rewritable non-volatile memory module 43 to execute the operation action corresponding to the operation command, such as storing data to the first physical unit or reading data from the first physical unit. However, if the memory management circuit 51 does not allow (that is, prohibit) the execution of the operation command on the first physical unit, then the memory management circuit 51 may not send the operation command sequence.

In an exemplary embodiment, by prohibiting or preventing the execution of the operation command on the first physical unit in advance, execution failure events of the rewritable non-volatile memory module may be effectively reduced. Alternatively, from another point of view, by prohibiting or preventing the execution of the operation command on the first physical unit in advance, the consumption of system resources may be effectively reduced on operation events that are expected to fail.

In an exemplary embodiment, assuming that the operation command is a write command. Before commanding the rewritable non-volatile memory module 43 to execute a data writing operation corresponding to the write command, the memory management circuit 51 may obtain characteristic information corresponding to the data writing operation. For example, the characteristic information may reflect that the data writing operation begins being programmed from a specific physical programming unit (also referred to as a second physical programming unit) in the first physical unit by adopting a specific operation mode (also referred to as a second operation mode).

After querying the management data, the memory management circuit 51 may compare the characteristic information with the query result (or the first status information). If the comparison result shows that the second operation mode is the same as the first operation mode and the second physical programming unit is a next physical programming unit of the first physical programming unit, then the memory management circuit 51 may determine that the data writing operation conforms to a preset operation specification. In response to the data writing operation conforming to the preset operation specification, the memory management circuit 51 may allow the execution of the write command on the first physical unit. For example, when the execution of the write command is allowed on the first physical unit, the memory management circuit 51 may command the rewritable non-volatile memory module 43 to execute the data writing operation corresponding to the write command.

However, if the comparison result reflects that the second operation mode is different from the first operation mode and/or the second physical programming unit is not the next physical programming unit of the first physical programming unit, then the memory management circuit 51 may determine that the data writing operation does not conform to the preset operation specification. In response to the data writing operation not conforming to the preset operation specification, the memory management circuit 51 may not allow (i.e. prohibit) the execution of the write command on the first physical unit. For example, when the execution of the write command on the first physical unit is not allowed, the memory management circuit 51 may not command the rewritable non-volatile memory module 43 to execute the data writing operation corresponding to the write command. In this way, the consumption of system resources are reduced on operation events that are expected to fail.

In an exemplary embodiment, assuming that the operation command is a read command. Before commanding the rewritable non-volatile memory module 43 to execute a data reading operation corresponding to the read command, the memory management circuit 51 may obtain characteristic information corresponding to the data reading operation. For example, the characteristic information may reflect that the data reading operation reads data from a specific physical programming unit (also referred to as a third physical programming unit) in the first physical unit by adopting a specific operation mode (i.e., the second operation mode).

After querying the management data, the memory management circuit 51 may compare the characteristic information with the query result (or the first status information). If the comparison result shows that the second operation mode is the same as the first operation mode and the third physical programming unit has been programmed, then the memory management circuit 51 may determine that the data reading operation conforms to the preset operation specification. In response to the data reading operation conforming to the preset operation specification, the memory management circuit 51 may allow the execution of the read command on the first physical unit. For example, when the execution of the read command is allowed on the first physical unit, the memory management circuit 51 may command the rewritable non-volatile memory module 43 to execute the data reading operation corresponding to the read command.

However, if the comparison result reflects that the second operation mode is different from the first operation mode and/or the third physical programming unit has not been programmed, then the memory management circuit 51 may determine that the data reading operation does not conform to the preset operation specification. In response to the data reading operation not conforming to the preset operation specification, the memory management circuit 51 may not allow (i.e. prohibit) the execution of the read command on the first physical unit. For example, when the execution of the read command on the first physical unit is not allowed, the memory management circuit 51 may not command the rewritable non-volatile memory module 43 to execute the data reading operation corresponding to the read command. In this way, the consumption of system resources are also reduced on operation events that are expected to fail or to be invalid (such as reading a physical programming unit that has not been programmed yet).

In an exemplary embodiment, assuming that the operation command is an erase command. Before commanding the rewritable non-volatile memory module 43 to execute a data erasing operation corresponding to the erase command, the memory management circuit 51 may obtain characteristic information corresponding to the data erasing operation. For example, the characteristic information may reflect that the data erasing operation is based on a specific operation mode (i.e., the second operation mode) to erase the first physical unit.

After querying the management data, the memory management circuit 51 may compare the characteristic information with the query result (or the first status information). If the comparison result shows that the second operation mode is the same as the first operation mode and the first physical unit has been programmed, then the memory management circuit 51 may determine that the data erasing operation conforms to the preset operation specification. In response to the data erasing operation conforming to the preset operation specification, the memory management circuit 51 may allow the execution of the erase command on the first physical unit. For example, when the execution of the erase command is allowed on the first physical unit, the memory management circuit 51 may command the rewritable non-volatile memory module 43 to execute the data erasing operation corresponding to the erase command.

However, if the comparison result reflects that the second operation mode is different from the first operation mode and/or the first physical unit has not been programmed yet, then the memory management circuit 51 may determine that the data erasing operation does not conform to the preset operation specification. In response to the data erasing operation not conforming to the preset operation specification, the memory management circuit 51 may not allow (i.e. prohibit) the execution of the erase command on the first physical unit. For example, when the execution of the erase command on the first physical unit is not allowed, the memory management circuit 51 may not command the rewritable non-volatile memory module 43 to execute the data erasing operation corresponding to the erase command. In this way, the consumption of system resources are also reduced on operation events that are expected to fail or to be invalid (such as erasing a physical unit that has not been programmed yet).

It should be noted that the characteristic information and the related operation specifications mentioned in the foregoing exemplary embodiments are only examples, rather than limiting the disclosure. In another exemplary embodiment, the characteristic information and the related operation specifications may also be set and adjusted according to practical needs, and the disclosure is not limited thereto.

In an exemplary embodiment, the management data further includes command recording data. The memory management circuit 51 may store command information corresponding to a specific chip enabled area (also referred to as a first chip enabled area) in the rewritable non-volatile memory module 43 in the command recording data. The first physical unit may be included in the first chip enabled area.

In an exemplary embodiment, the command information is related to at least one operation command issued to the first chip enabled area in the past. For example, the command information may reflect a command content of a last operation command issued to the first chip enabled area. For example, the command content may include types of operation command (such as the write command, the read command, or the erase command), a data content carried by the operation command and/or the physical unit or the physical programming unit targeted by the operation command.

In an exemplary embodiment, the query result may further include a query result of the command information. For example, according to the query result, the memory management circuit 51 may obtain the first status information and the command information. Then, the memory management circuit 51 may determine whether to allow an execution of a specific operation command on the first physical unit according to the first status information and the command information.

In an exemplary embodiment, two successive operation commands issued and targeted for the same chip enabled area have to conform to a specific operation specification, for example, a next operation command may not be executed until a previous operation command is executed completely, including that the next operation command may not be executed until cached data of the previous read or write command has been moved completely, and/or a reset may not be executed until the previous operation command is executed completely. In addition, different types of memory storage devices may also set different operation specifications for the two successive operation commands issued and targeted for the same chip enabled area, and the disclosure is not limited thereto.

In an exemplary embodiment, comparing the characteristic information of the operation action corresponding to the operation command with the query result and determining whether to allow the execution of the operation command on the first physical unit according to the comparison result further includes referring to the query result for the command information. The execution of the next operation command may only be allowed to target for the first chip enabled area under the premise of meeting the relevant operation specifications. In this way, the consumption of system resources are also reduced on operation events that are expected to fail or to be invalid.

It should be noted that the various operation specifications mentioned in the aforementioned exemplary embodiments are just examples, and the disclosure is not limited thereto. In other exemplary embodiments, the memory management circuit 51 may determine whether to allow an execution of a specific operation command on the first physical unit according to the query result of the management data together with other operation specifications or strategies, which will not be described here.

In an exemplary embodiment, after determining that the execution of the specific operation command on the first physical unit is not allowed, the memory management circuit 51 may send a substitute response message corresponding to the operation command to the host system 11 in a situation that the operation command is not executed. For example, targeting for a read command, a write command, or an erase command that is not allowed to be executed, the memory management circuit 51 may directly send a read failure (or success) message, a write failure (or success) message, or an erase failure (or success) message to the host system 11, depending on the practical needs. In this way, the working efficiency of the rewritable non-volatile memory module can be improved by reducing the execution of meaningless or expected failure operation commands.

Figure 8:
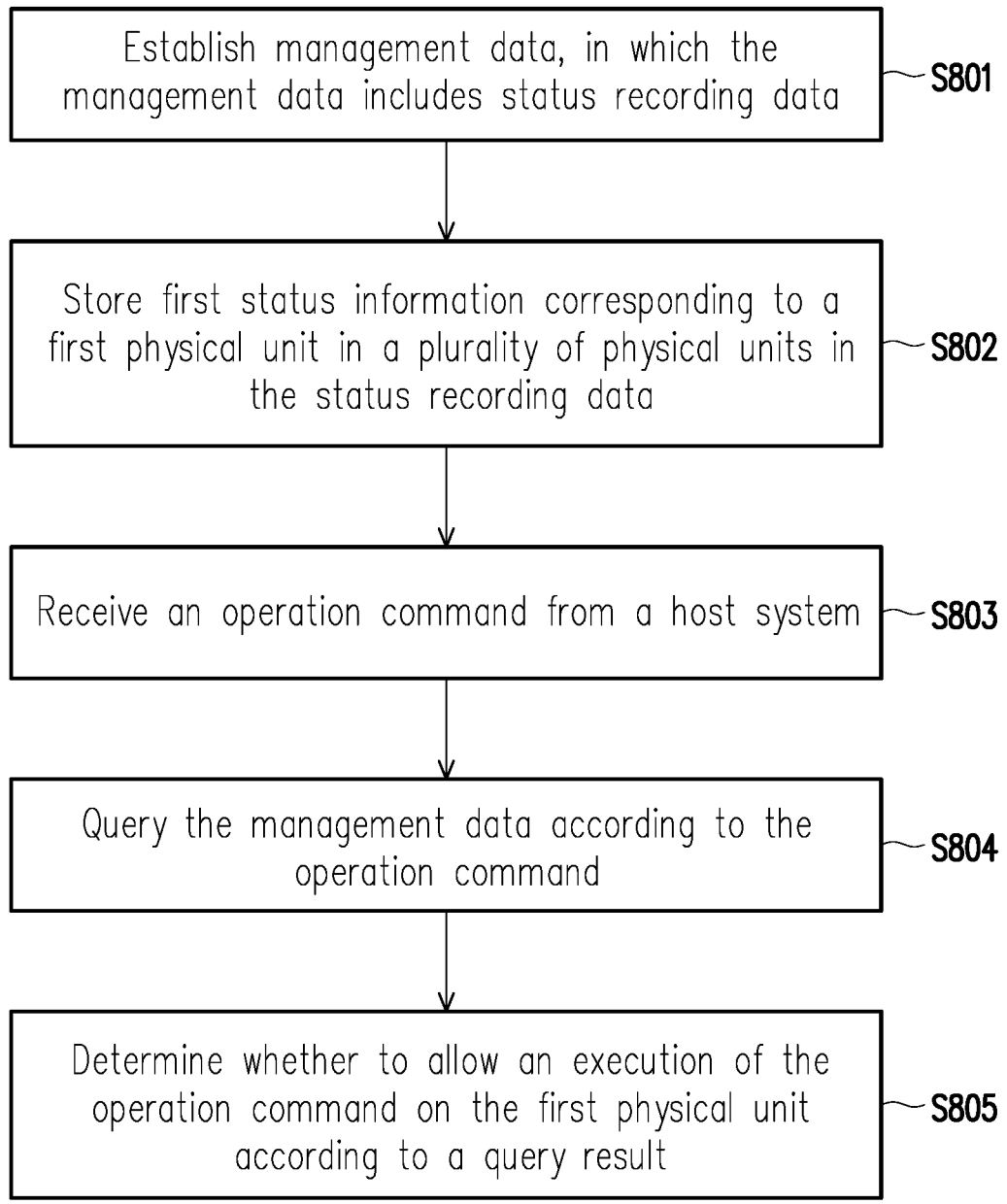
FIG. 8 is a flowchart illustrating a memory operation control method according to an exemplary embodiment of the disclosure.

FIG. 8 is a flowchart illustrating a memory operation control method according to an exemplary embodiment of the disclosure. Please refer to FIG. 8. In Step S801, management data is established, in which the management data includes status recording data. In Step S802, first status information corresponding to a first physical unit is stored in the status recording data. In Step S803, an operation command from a host system is received. In Step S804, the management data is queried according to the operation command. In Step S805, whether to allow an execution of the operation command on the first physical unit is determined according to a query result.

However, each Step in FIG. 8 has been described in detail above, and will not be repeated here. It should be noted that each Step in FIG. 8 may be implemented as a plurality of codes or circuits, and the disclosure is not limited thereto. In addition, the method in FIG. 8 may be used in combination with the above exemplary embodiments, or may be used alone, and the disclosure is not limited thereto.

In summary, the memory operation control method, the memory storage device, and the memory control circuit unit provided by the exemplary embodiments of the disclosure can improve the working efficiency of the rewritable non-volatile memory module by reducing or prohibiting the execution of meaningless or expected failure operation commands.

Although the disclosure has been disclosed as above with the embodiments, the embodiments are not intended to limit the disclosure. Persons with ordinary knowledge in the technical field may make some changes and modifications without departing from the spirit and scope of this case. Therefore, the protection scope of the disclosure shall be defined by the appended claims.

What is claimed is:

1. A memory operation control method for a rewritable non-volatile memory module, wherein the rewritable non-volatile memory module comprises a plurality of physical units, and the memory operation control method comprises:

establishing management data, wherein the management data comprises status recording data;

storing first status information corresponding to a first physical unit of the plurality of physical units as the status recording data;

receiving an operation command from a host system;

querying the management data according to the operation command;

determining whether to allow an execution of the operation command on the first physical unit according to a query result; and sending a substitute response message corresponding to the operation command to the host system in a situation that the operation command is not executed after determining that the execution of the operation command on the first physical unit is not allowed.

2. The memory operation control method according to claim 1, wherein the first status information reflects an operation mode of the first physical unit.

3. The memory operation control method according to claim 1, wherein the first status information reflects a data storage status of the first physical unit.

4. The memory operation control method according to claim 3, wherein the first status information comprises address information of a last programmed physical programming unit in the first physical unit.

5. The memory operation control method according to claim 1, wherein the rewritable non-volatile memory module further comprises a plurality of chip enabled areas, the first physical unit is positioned in a first chip enabled area of the plurality of chip enabled areas, the management data further comprises command recording data, and a memory status identification method further comprises:

storing command information corresponding to the first chip enabled area in the command recording data, wherein the command information is related to at least one operation command issued to the first chip enabled area in the past.

6. The memory operation control method according to claim 5, wherein the command information reflects a command content of a last operation command issued to the first chip enabled area.

7. The memory operation control method according to claim 1, wherein determining whether to allow the execution of the operation command on the first physical unit according to the query result comprises:

comparing characteristic information of an operation action with the query result before commanding the rewritable non-volatile memory module to execute the operation action corresponding to the operation command;

commanding the rewritable non-volatile memory module to execute the operation action in response to a comparison result reflecting that the characteristic information matches the query result; and not commanding the rewritable non-volatile memory module to execute the operation action in response to the comparison result reflecting that the characteristic information does not match the query result.

8. A memory storage device, comprising:

a connection interface unit configured to couple to a host system;

a rewritable non-volatile memory module, wherein the rewritable non-volatile memory module comprises a plurality of physical units; and a memory control circuit unit coupled to the connection interface unit and the rewritable non-volatile memory module, wherein the memory control circuit unit is configured to:

establish management data, wherein the management data comprises status recording data;

store first status information corresponding to a first physical unit of the plurality of physical units as the status recording data;

receive an operation command from the host system;

query the management data according to the operation command;

determine whether to allow an execution of the operation command on the first physical unit according to a query result; and send a substitute response message corresponding to the operation command to the host system in a situation that the operation command is not executed after determining that the execution of the operation command on the first physical unit is not allowed.

9. The memory storage device according to claim 8, wherein the first status information reflects an operation mode of the first physical unit.

10. The memory storage device according to claim 8, wherein the first status information reflects a data storage status of the first physical unit.

11. The memory storage device according to claim 10, wherein the first status information comprises address information of a last programmed physical programming unit in the first physical unit.

12. The memory storage device according to claim 8, wherein the rewritable non-volatile memory module further comprises a plurality of chip enabled areas, the first physical unit is positioned in a first chip enabled area of the plurality of chip enabled areas, the management data further comprises command recording data, and the memory control circuit unit is further configured to:

store command information corresponding to the first chip enabled area in the command recording data, wherein the command information is related to at least one operation command issued to the first chip enabled area in the past.

13. The memory storage device according to claim 12, wherein the command information reflects a command content of a last operation command issued to the first chip enabled area.

14. The memory storage device according to claim 8, wherein the memory control circuit unit determining whether to allow the execution of the operation command on the first physical unit according to the query result comprises:

comparing characteristic information of an operation action with the query result before commanding the rewritable non-volatile memory module to execute the operation action corresponding to the operation command;

commanding the rewritable non-volatile memory module to execute the operation action in response to a comparison result reflecting that the characteristic information matches the query result; and not commanding the rewritable non-volatile memory module to execute the operation action in response to the comparison result reflecting that the characteristic information does not match the query result.

15. A memory control circuit unit configured to control a rewritable non-volatile memory module, wherein the rewritable non-volatile memory module comprises a plurality of physical units, and the memory control circuit unit comprises:

a host interface configured to couple to a host system;

a memory interface configured to couple to the rewritable non-volatile memory module; and a memory management circuit coupled to the host interface and the memory interface, wherein the memory management circuit is configured to:

establish management data, wherein the management data comprises status recording data;

store first status information corresponding to a first physical unit of the plurality of physical units as the status recording data;

receive an operation commands from the host system;

query the management data according to the operation command;

determine whether to allow an execution of the operation command on the first physical unit according to the query result; and send a substitute response message corresponding to the operation command to the host system in a situation that the operation command is not executed after determining that the execution of the operation command on the first physical unit is not allowed.

16. The memory control circuit unit according to claim 15, wherein the first status information reflects an operation mode of the first physical unit.

17. The memory control circuit unit according to claim 15, wherein the first status information reflects a data storage status of the first physical unit.

18. The memory control circuit unit according to claim 17, wherein the first status information comprises address information of a last programmed physical programming unit in the first physical unit.

19. The memory control circuit unit according to claim 15, wherein the rewritable non-volatile memory module further comprises a plurality of chip enabled areas, the first physical unit is positioned in a first chip enabled area of the plurality of chip enabled areas, the management data further comprises command recording data, and the memory management circuit is further configured to:

store command information corresponding to the first chip enabled area in the command recording data, wherein the command information is related to at least one operation command issued to the first chip enabled area in the past.

20. The memory control circuit unit according to claim 19, wherein the command information reflects a command content of a last operation command issued to the first chip enabled area.

21. The memory control circuit unit according to claim 15, wherein the memory management circuit determining whether to allow the execution of the operation command on the first physical unit according to the query result comprises:

comparing characteristic information of an operation action with the query result before commanding the rewritable non-volatile memory module to execute the operation action corresponding to the operation command;

commanding the rewritable non-volatile memory module to execute the operation action in response to a comparison result reflecting that the characteristic information matches the query result; and not commanding the rewritable non-volatile memory module to execute the operation action in response to the comparison result reflecting that the characteristic information does not match the query result.

* * * * *